Dec. 19, 1933.  E. H. HAUTZ  1,940,350
AERATING APPARATUS
Filed March 12, 1932   3 Sheets-Sheet 2

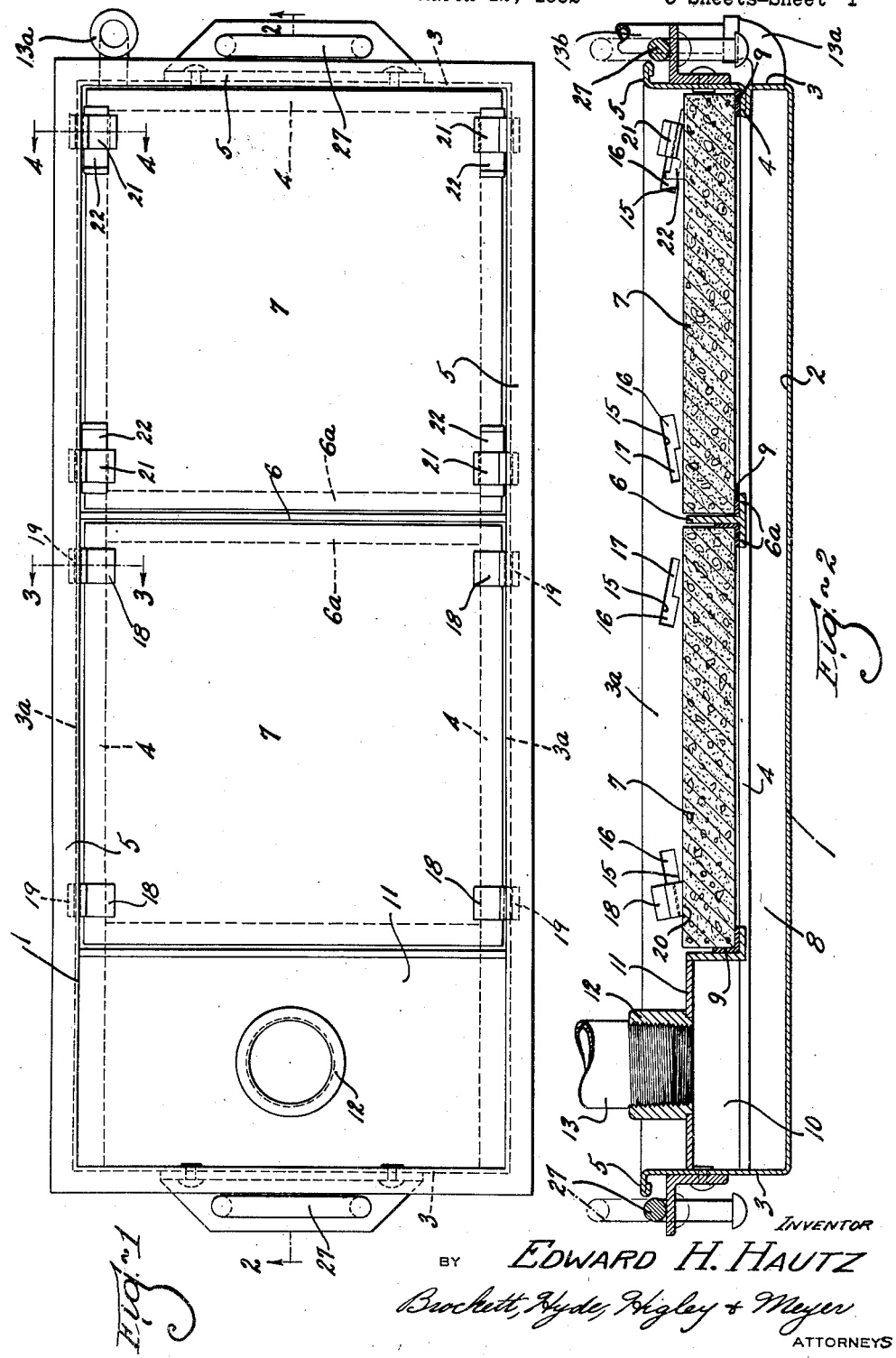

INVENTOR
EDWARD H. HAUTZ
BY
Brackett, Hyde, Higley & Meyer
ATTORNEYS

Dec. 19, 1933.  E. H. HAUTZ  1,940,350
AERATING APPARATUS
Filed March 12, 1932    3 Sheets-Sheet 3

INVENTOR
EDWARD H. HAUTZ
BY
ATTORNEYS

Patented Dec. 19, 1933

1,940,350

UNITED STATES PATENT OFFICE 1,940,350

AERATING APPARATUS

Edward H. Hautz, Lakewood, Ohio

Application March 12, 1932. Serial No. 598,468

5 Claims. (Cl. 210—8)

This invention relates to aerating apparatus such as is used for treating sewage by the activated sludge or other aerating process.

In said process the sewage, in the presence of a quantity of sludge or settled matter from sewage previously aerated which has been enlivened or charged with living bacteria or other living organisms and returned, is aerated for the purpose of producing turbulence and bringing the sludge in intimate contact with the suspended matter in the sewage and also for promoting and assisting in bacterial propagation. The mixture of sewage and sludge flows slowly through or is held in tanks in the bottoms of which are located suitable filtering or air diffusing or distributing members, frequently in the form of porous plate like blocks of silica carborundum or like refractory materials through which air is introduced into the bottom of the stream, rising in more or less the form of a curtain of very minute air bubbles, the effect of which is to stir up the stream or liquid mass and produce some turbulence and mixture and also to supply oxygen for the promotion and propagation of bacterial growth, with its consequent activating effect upon the sewage being treated. The aforesaid porous blocks or other air distributing members are more or less expensive and require cleaning or renewal at intervals.

The present invention has for its object to provide holders for the air distributing members, whether in the form of porous silica blocks or otherwise, such holders being of improved form and not only unaffected by the liquids passing over them, but also incapable of interfering with the sewage process, in addition to which my improved arrangement permits the air distributing members to be readily removed and replaced without injury, so that their life is materially increased, and also in reduced time to thereby reduce the period during which the treating tank is out of operation during replacement.

A further object is to provide holders of this kind which can be handled as a unit and so removed from or placed in their operating position, and which also insure not only distribution of air in a convenient manner and to all porous air distributing members in use, but further insure that all air so supplied passes through the air distributing members and consequently is broken up into the finest and most minute bubbles possible, with the securement of increased efficiency in the treating process.

A further object of the invention is to provide holders of the kind described which not only support the air distributing members in a manner to form a properly sealed air conducting channel, but also include releasable locking or holding means enabling said members to be readily removed and replaced in a very short time.

A further object is to provide an arrangement of this kind in which the air distributing members, when laid in place for operation, provide essentially a smooth flat upper surface with no appreciable cavities or recesses in which sludge or other solid material might lodge and interfere with air circulation or further operation of the process.

Further objects of the invention are in part obvious and in part will appear more in detail hereinafter.

In the drawings, Fig. 1 represents a plan view of one form of holder embodying the invention.

Fig. 2 is a longitudinal sectional elevation thereof on the line 2—2, Fig. 1.

Figure 8:
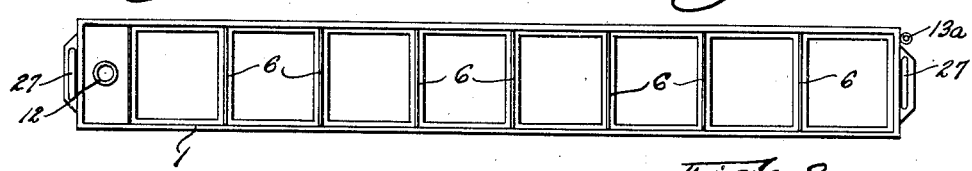
Fig. 8 is a diagrammatic plan view, showing another arrangement of blocks.
Figure 9:
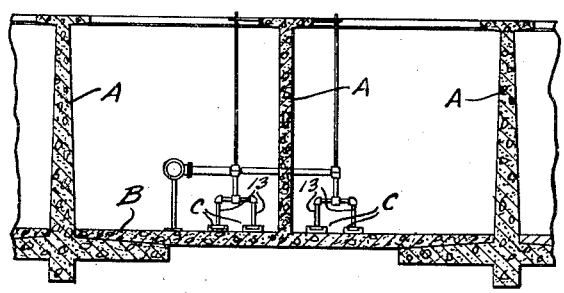
Fig. 9 is a detail sectional elevation, somewhat diagrammatic, showing the treating vat or container.
Figure 10:
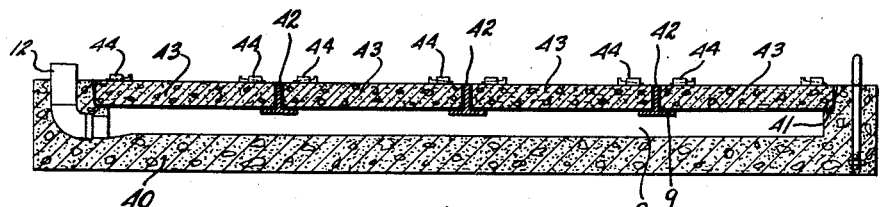
Fig. 10 is a longitudinal section through another form of the invention, the section being taken on the line 10—10 of Fig. 11.
Figure 11:
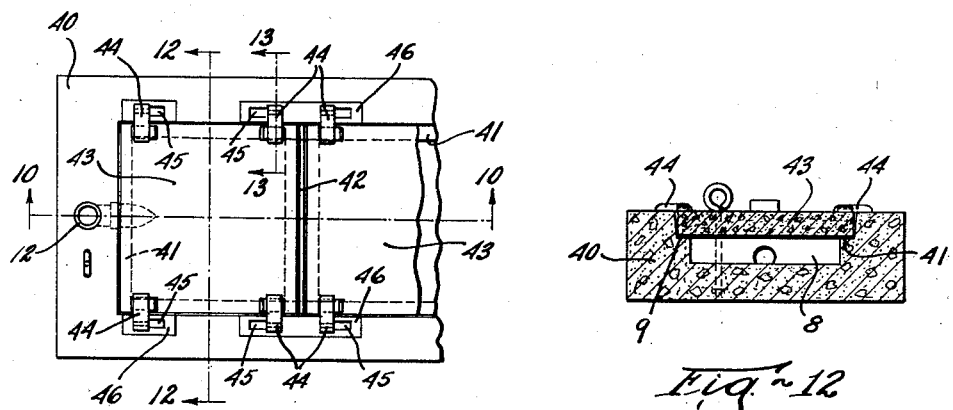
Fig. 11 is a plan view thereof.
Figure 12:
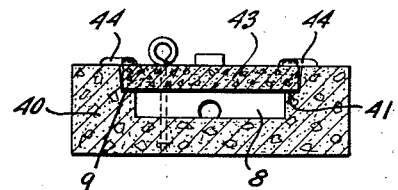
Fig. 12 is a cross section on the line 12—12, Fig. 11.
Figure 13:
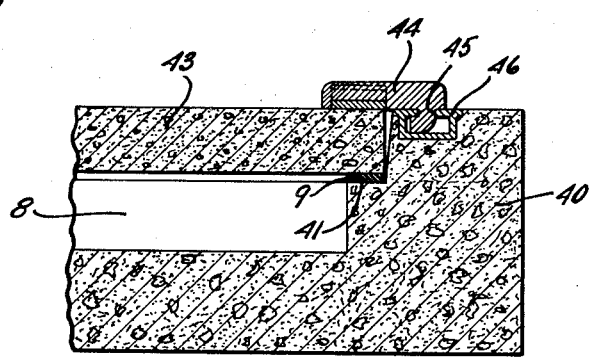
Fig. 13 is a cross section, on a larger scale, on the line 13—13, Fig. 11.

Referring first to Fig. 9, A and B represent the side walls and bottom of the aerating tank or vessel in which the sewage is to be treated. It may be of any suitable size or shape and the liquid material may be either held in the tank during the treatment or permitted to flow slowly therethrough. Usually the tank is deep enough so that there is a head of about ten to fifteen feet or so of liquid material above the tank bottom and each compartment of the tank may be say twenty feet more or less across and two hundred feet more or less in length. In the bottom or at any desired elevation of each compartment, of which two are shown in Fig. 9, are located groups of air distributing units of the type here involved. These units are arranged in various ways. In some instances rows are laid crosswise of the long tank at intervals, say every ten to twenty feet, while in other cases one or more rows are laid longitudinally down one side of the tank, extending practically continuously from one end to the other. Also, combinations of longitudinal and transverse arrangements are used. The longitudinal arrangement is shown in Fig. 9 where C represents two rows of holder units each adapted to contain a plurality of air disturbing members. The holders may be of any suitable or desired shape and size, but a common form of air distributing member is a porous silica block about twelve inches square and an inch and a half or so in thickness, and the holder may be formed to contain a single block or, in end to end or tandem relation, anywhere from one to ten or more such blocks. Fig. 8 shows diagrammatically a holder containing eight blocks, and Fig. 1 a holder containing two blocks, and this latter form will be referred to for convenience in description but not in any sense of limitation.

The holders for the blocks may be made of any suitable material which is non-corrodible and does not injuriously affect the sewage treating operation. For example, they may be made of concrete, vitrified tile, or other similar ceramic materials, or of certain metals. For convenience the metal form will first be described.

Referring to Fig. 1, each holder comprises a metal body portion 1 preferably made of sheet metal in more or less shallow pan form. It may be made of any suitable material which is not corroded by the sewage or other liquid being treated and which does not interfere with the process being performed. For example, ferrous oxide is harmful to certain types of filtering or air distributing devices, such as the porous blocks referred to, because of its likelihood of clogging the pores, and it is therefore desirable under such circumstances to use non-ferrous materials for the tank walls, piping, valves, fittings and the parts of the holders being described, but the invention, of course, is not limited to any particular form or construction of air diffusing members, and members made of wire screen or any other foraminous or porous material are suitable. The holders may be made of galvanized iron, but to increase their life and to avoid any possibility of either deterioration of the holders or harmful effect upon the sewage treating process, the holders may be made of aluminum in the form of sheets pressed or cut and bent to proper shape. Such material is practically unaffected by and produces no effect upon the liquid materials handled in this sewage aerating process.

The pan shown in Figs. 1 and 2 of the drawings has a flat bottom 2, end walls 3 and side walls 3a, the end and side walls being suitably secured at the corners so as to seal the joints, and being bent to the form shown in cross section in Fig. 2, providing by an inwardly extending fold of the metal an inner horizontal flange 4 extending the full length of the end and side walls and a horizontal flange 5 extending outwardly at the upper edges of said walls. At intervals along the length of the holder, its side walls are connected by cross bars 6 which may be of inverted T form suitably secured to the side walls and having the flanges 6a of the T's extending horizontally at the same level as the wall flanges 4 to form continuations thereof. Such an arrangement divides the long pan-like tray into a series of compartments each adapted to receive a single air distributing member 7, such compartments being rectangular in the form illustrated, which is adapted to receive the 12-inch square blocks before referred to.

The holder is so arranged as to completely seal all edges of the air diffusing members to the holder, so that the row of members lying end to end and in the same plane becomes the upper wall, as it were, of an air channel 8 lying beneath them and above the tray bottom. For sealing purposes any suitable arrangement may be used, preferably one in which the sealed joint may be broken without injuring the air distributing members, such as is necessary in cleaning or renewing the same. I show for the purpose gasket members 9 of rubber or like material, which may be formed or bent into L-form, as shown at the right in Fig. 2, or may be simple plates or strips extending entirely horizontally, as at the left in Fig. 2. These gaskets extend around the four edges of each member 7 to entirely seal the edges thereof against any escape of air except through the material of the porous member itself.

Means is provided for supplying air to the longitudinally extending channel 8, for which purpose the holder shown in Fig. 2 has a short end compartment 10 closed by an upper metal wall 11 secured to the holder, said wall 11 having secured thereto a coupling 12 to which an air supply pipe 13 may be connected, as by a threaded connection. The supply pipe will be made of aluminum or some other non-corrosive and non-corrodible material and more or less rigid and strong, the pipes 13 shown for the purpose in Fig. 9 forming part of a piping system extending throughout the bank of tanks and which pipes therefore form a more or less rigid framework for confining the holders in place and preventing them from becoming dislodged by the current flow or by any buoyant tendency as the result of air supplied to them for aerating purposes.

A threaded connection 13a may also be provided at the opposite end and connected to a valved piping system 13b, so that water or air may be flooded or circulated through the unit from one end to the other for cleaning it out when desired.

Figure 3:
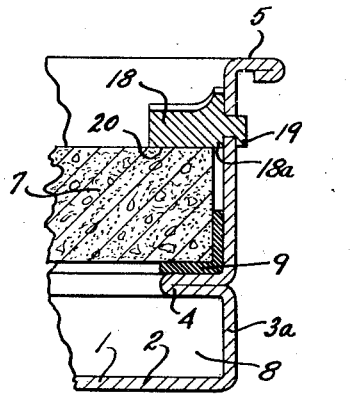
Fig. 3 is a detail cross section on the line 3—3, Fig. 1.
Figure 4:
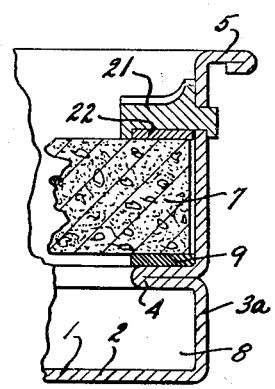
Fig. 4 is a detail cross section on the line 4—4, Fig. 1.

One important feature of the present invention is the provision of means for releasably securing the air diffusing members to the holder in which they are carried. This releasable means is of very simple construction adapted for manufacture at low cost, capable of ready attachment and disconnection, and nevertheless arranged to securely hold the diffusing members in place when once applied. In the arrangement shown in Fig. 2, detachable connection of the diffusing members to their holder is accomplished by providing at intervals along the side walls through slots or openings 15 located above the upper surfaces of the diffusing members and provided with upper wide portions 16 and lower narrower portions 17. These slots or openings have inclined upper and lower edges and are adapted to receive removable clamping or locking means for the air diffusing devices. Two forms of such means are shown in Figs. 2, 3 and 4. In Fig. 3 the locking means consists of a single member 18 having a hook shaped foot portion 19 adapted to be passed through the wide portion 16 of a slot, the body portion thereof having a flange 18a adapted to be applied to the inner surface of the pan wall and also having a horizontal bottom surface 20 adapted to be applied directly to the surface of the diffusing member. This key is used by pushing its hooked end through the wide portions of the slot 16 and sliding it down to the narrower portion thereof, thereby applying the lower clamping surface 20 to the upper surface of the air distributing block and pressing the latter downward against its yielding supporting sealing gasket 9.

In Fig. 4 the locking means shown comprises two members, to wit, an anchor member 21 with interlocking engagement with an inclined opening 16, as before described, but with its body portion provided with parallel upper and lower surfaces both lying at an incline to the horizontal, and the lower surface adapted to receive a wedge 22 which is driven into place between it and a diffusing block. The anchor member is inserted into a slot and is moved down to its narrower part, whereupon the key is driven into clamp the diffusing member down against the yielding gasket as before.

Figure 5:
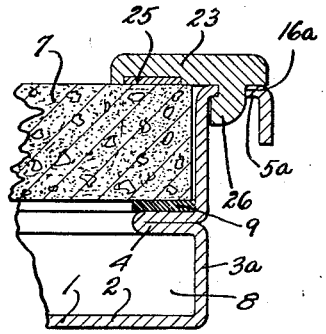
Fig. 5 is a cross sectional view, corresponding to Fig. 3, and illustrating another form of locking device.
Figure 6:
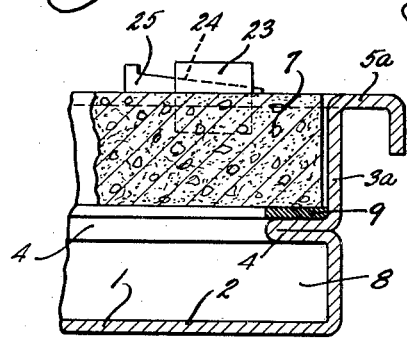
Fig. 6 is an elevation from the left in Fig. 5.

Fig. 5 shows still another arrangement in which the attachment of the locking member to the side walls of the tray is effected along the upper horizontal flanges of said side walls. The locking key for the side walls, in this case, has a body portion 23 extending inwardly over the diffusing member and cut out along an incline on its lower surface, as at 24, to receive the wedge 25. Its outer portion lies over the outwardly extending horizontal flange 5a, of the side wall which is provided with a slot 16a having wide and narrow portions as before and adapted to receive a hooked anchoring end portion 26 of the key. In this case, as before, the anchor member is introduced into its slot and is moved endwise to its narrower part, after which the wedge is introduced and driven home to clamp the diffusing member to its yielding gasket seat. This arrangement has the advantage that when all parts are fastened together, as shown in Fig. 5, the upper surface of the air distributing member is in the same plane with the horizontal flange of the side wall of the holder, so that a smooth surface is presented to the liquid being treated and there is no shallow tray formation in which solid matter may lodge and possibly interfere either with air flow or with movement of the material being treated. At each end the holder is provided with a lifting and carrying handle 27, which handles normally drop to the position shown in full lines, but may be pulled up to the dotted line position when necessary.

Figure 7:
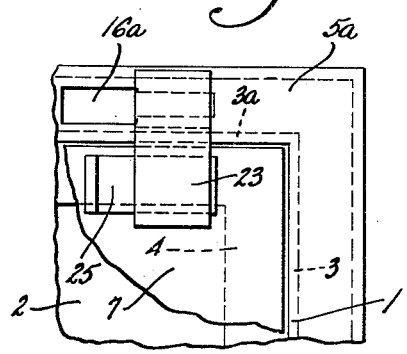
Fig. 7 is a plan view corresponding to Fig. 5.

Figs. 10 to 13 inclusive show another arrangement in which the body portion 40 of the pan shaped member is made of cement or like material, either pre-cast as a portable or individual unit which may be carried from place to place, or cast with the floor of the tank itself, as will be readily understood. This body portion is formed to provide a peripherally extending shoulder 41 and is also provided with cross bars 42 which form seats for the porous blocks 43, which are removably clamped to gaskets beneath them by clamping devices 44 insertable into slots 45 similar to those shown in Fig. 7, and formed in metal holding members 46 which are anchored in the cement during the formation thereof. The clamping devices 44 are of substantially the same form and operate in the same way as those described in Fig. 5, the essential difference between the two forms being that the construction in Fig. 5 embodies a metal pan shaped tray, while that shown in Fig. 10 embodies a cement pan or tray.

With all arrangements, the trays or holders may be laid either directly on the flat bottom of the tank or in a groove or channel therein or upon supports above its bottom and may further be secured by cement anchors or the like or left unattached for ready removal. In any case, when the air diffusing members are laid in place and clamped by keys, usually four keys to a block in the arrangement shown, the air channels are sealed by the gaskets against any escape of air to the liquid except through the material of the diffusing members themselves. As a consequence, the air is delivered in very minute bubbles, as is desirable and necessary for proper performance of the activated sludge method. At the same time the air distributing members can be changed very easily and without breaking or injuring them, for which purpose the tank is emptied of liquid to expose the holders, the keys are removed and the blocks taken out and replaced by fresh ones, or those removed are cleaned and replaced, as will be readily understood. In addition, where downward clamping pressure is applied to the diffusing members from above, such as by the inclination of the walls of slot 16 or by the use of the wedges 22 or 25, the downward pressure is exerted against the yielding gasket on which the diffusing member rests, which gasket therefore serves as a cushion to prevent breaking of the more or less fragile diffusing member, such as might occur if said member rested upon a solid unyielding seat of either cement or metal, as is usual in these devices.

The various forms of keys or locks shown may be made of aluminum or other similar material, are readily fabricated from standard or special bar shapes at low cost of manufacture, and said locks involve no threads or other parts likely to corrode, get out of order or become rusted fast, as might otherwise occur.

What I claim is:

1. An aerating device for sewage disposal plants, comprising a pan shaped tray having side walls provided with a supporting shoulder above its bottom, an air distributing member supported on said shoulder, the side walls above said member being provided with slots, and locking keys for said member releasably insertable into said slots.

2. An aerating device for sewage disposal plants, comprising a pan shaped tray having its side walls provided above its bottom with a supporting shoulder, an air distributing member supported on said shoulder, the side walls above said member being provided with inclined slots, and wedge means adapted for interlocking engagement with the edge portions of said slots and extending over said member for clamping the same in place.

3. An aerating device for sewage disposal plants, comprising a pan shaped tray having a supporting shoulder, an air distributing member thereon, the side walls being provided with inclined slots, anchoring members insertable into said slots, and wedges lying between said anchoring members and distributing member for clamping the latter.

4. An aerating device for sewage disposal plants, comprising a pan shaped tray provided with a horizontally extending supporting shoulder above its bottom, the vertical pan walls being provided with an outwardly extending horizontal portion above said shoulder, said horizontal portion having openings therein, an air distributing member supported on said shoulder, releasable locking devices removably insertable into said openings and extending over said member for removably securing it in place, a yieldable sealing and supporting gasket lying on said shoulder beneath the air distributing member, and a removable wedge insertable between said locking device and the upper surface of said member for clamping the latter in place.

5. An aerating device for sewage disposal plants, comprising a pan shaped tray provided with a peripherally extending horizontal supporting shoulder above its bottom, a yielding sealing and supporting gasket lying on said shoulder, an air distributing member supported on said yielding gasket, the vertical pan walls being provided with removable adjustable clamping means extending over the air distributing member and adapted to clamp the same downwardly to said gasket.

EDWARD H. HAUTZ.